US011989679B2

(12) United States Patent
Mandviwalla et al.

(10) Patent No.: US 11,989,679 B2
(45) Date of Patent: May 21, 2024

(54) SYSTEM AND METHOD FOR QUANTIFYING PROFESSIONAL DEVELOPMENT

(71) Applicant: Temple University-Of The Commonwealth System of Higher Education, Philadelphia, PA (US)

(72) Inventors: Munir Y. Mandviwalla, Haddonfield, NJ (US); Manoj J. Chacko, Huntingdon Valley, PA (US); Laurel A. Miller, Collingdale, PA (US)

(73) Assignee: Temple University-Of The Commonwealth System of Higher Education, Philadelphia, PA (US)

( * ) Notice: Subject to any disclaimer, the term of this patent is extended or adjusted under 35 U.S.C. 154(b) by 772 days.

(21) Appl. No.: 16/286,910

(22) Filed: Feb. 27, 2019

(65) Prior Publication Data

US 2020/0090104 A1 Mar. 19, 2020

Related U.S. Application Data

(60) Provisional application No. 62/732,151, filed on Sep. 17, 2018.

(51) Int. Cl.
*G06Q 10/0639* (2023.01)
*G06Q 10/0631* (2023.01)

(52) U.S. Cl.
CPC ........... *G06Q 10/06398* (2013.01); *G06Q 10/063114* (2013.01); *G06Q 10/06393* (2013.01)

(58) Field of Classification Search
None
See application file for complete search history.

(56) References Cited

U.S. PATENT DOCUMENTS

| 6,119,097 A * | 9/2000 | Ibarra | G09B 7/00 |
| | | | 705/7.42 |
| 7,024,372 B2 * | 4/2006 | Kobayashi | G06Q 10/06 |
| | | | 705/7.42 |

(Continued)

FOREIGN PATENT DOCUMENTS

| WO | WO-2005017688 A2 * | 2/2005 | ............... G09B 7/00 |
| WO | 2018053444 | 3/2018 | |

OTHER PUBLICATIONS

Kwang et al "Reviewing the evidence on how teacher professional development affects student achievement", Dec. 2007, Issues & Answers, pp. 1-55 (Year: 2007).*

(Continued)

*Primary Examiner* — Romain Jeanty
(74) *Attorney, Agent, or Firm* — Riverside Law LLP (57) ABSTRACT

A method for quantifying the professional development of a subject includes storing, on a non-transitory computer-readable medium, a base professional development score for a subject, receiving a submission pertaining to a professional development activity of the subject, approving the submission based on at least one professional development criteria, assigning a value to the approved submission, adjusting the base professional development score according to the approved submission value, comparing the adjusted professional development score to a threshold value, and determining that the subject has achieved a professional development goal when the adjusted professional development score is greater than the threshold value. A system for quantifying the professional development, a system for network-assisted recruitment, and a system for network-assisted learning are also described.

17 Claims, 7 Drawing Sheets

(56) References Cited

U.S. PATENT DOCUMENTS

| | | | | |
|---|---|---|---|---|
| 7,054,821 | B1* | 5/2006 | Rosenthal | G06Q 10/06398 705/348 |
| 8,812,532 | B2* | 8/2014 | Skaf | G06F 16/954 707/768 |
| 2002/0019765 | A1* | 2/2002 | Mann | G06Q 10/063112 705/7.14 |
| 2003/0004789 | A1* | 1/2003 | Calderaro | G06Q 10/06398 705/7.42 |
| 2003/0187725 | A1* | 10/2003 | Jotkowitz | G09B 7/00 705/7.42 |
| 2011/0055035 | A1* | 3/2011 | Koskay | G06Q 50/2057 705/26.1 |
| 2011/0229864 | A1 | 9/2011 | Short | |
| 2012/0208168 | A1* | 8/2012 | Atkinson | G06Q 10/06398 434/362 |
| 2013/0117368 | A1* | 5/2013 | Dozier | H04L 65/403 709/204 |
| 2014/0032279 | A1* | 1/2014 | Zanichelli | G06Q 10/1053 705/321 |
| 2014/0180771 | A1* | 6/2014 | Reed | G06Q 50/20 705/7.42 |
| 2016/0071424 | A1 | 3/2016 | Harney | |
| 2018/0025088 | A1* | 1/2018 | Jaspal | G06F 16/24578 707/722 |
| 2019/0066525 | A1* | 2/2019 | Palau | G09B 5/00 |

OTHER PUBLICATIONS

Ormond "Measuring The Effectiveness of Professional Development in Early Literacy: Lessons Learned", Pacific Resources for Education and Learning, Nov. 2005, pp. 1-6 (Year: 2005).*

"Digital Identity Management, Temple Community Platform", https://community.mis.temple.edu/mis2101templatefall2015/files/2015/08/Learn-IT-1-for-Non-MIS-Majors.pdf, Aug. 1, 2015, retrieved May 9, 2018, 13 pages.

Croitoru et al. "A Critical Analysis of Learning Management Systems in Higher Education", Economy Informatics 16, 1, (2016) pp. 5-18.

Malamed, Connie, "Axonify Review: An Effective Model for Online Learning", http://theelearningcoach.com/reviews/software/axonify-review/, Retrieved May 9, 2018, 6 pages.

Mandviwalla et al., "Achieving continuous professional development in higher education". In: Donnellan, B., Gleasure, R., Helfert, M., Kenneally, J., Rothenberger, M., Chiarini Tremblay, M., Vandermeer, D. & Winter, R. (eds.) At the Vanguard of Design Science: First Impressions and Early Findings from Ongoing Research Research-in-Progress Papers and Poster Presentations from the 10th International Conference, Desrist 2015. Dublin, Ireland, May 20-22. pp. 127-128.

Mauri et al., "Docebo June roll-out: new LMS features & integrations", https://www.docebo.com/blog/docebo-learning-management-system-661-new-features/, Retrieved May 9, 2018, 4 pages.

Pappas, Christopher, "Docebo Review: A Modular Learning Management System with a Unique Design", https://elearningindustry.com/docebo-review-modular-learning-management-system-unique-design, May 3, 2016, retrieved May 9, 2018, 7 pages.

Professional Achievement v3, http://community.mis.temple.edu/blog/2015/11/11/professional-achievement-v3, Nov. 11, 2015, retrieved May 9 2018, 3 pages.

Shama, Nipun, "*Adobe New LMS: Adobe Captivate Prime LMS* vs. *Conventional LMSs*", https://elearningindustry.com/adobe-captivate-prime-lms-vs-conventional-lmss, Dec. 6, 2016, retrieved May 9, 2018, 7 pages.

* cited by examiner

Earn Points

| CATEGORY | ACTIVITY | POINTS | LIMITS | DOCUMENTATION | SUBMISSION |
|---|---|---|---|---|---|
| Attendance | AIS professional development workshop | 10 | 5 per semester | Not required | AIS |
| Attendance | Professional development event at an external organization | 25 | Twice only and must be pre-approved | Pre-approved | Request now |
| Award | Win a challenge or competition | 100 | | Not required for internal awards | Request now |
| Full-time Job | Report accepted full-time job offer | 100 | 1 per student | Offer letter | Request now |
| Leadership | AIS committee chair | 30 | 1 per semester | Not required | AIS |
| Leadership | AIS officer | 75 | 1 per semester | Not required | AIS |
| Participation | AIS committee member | 15 | 1 per semester | Not required | AIS |
| Participation | Other career fair | 20 | 2 per semester | Picture of Badge | Request now |

SYSTEM AND METHOD FOR QUANTIFYING PROFESSIONAL DEVELOPMENT

CROSS-REFERENCE TO RELATED APPLICATIONS

This application claims priority to U.S. provisional patent application No. 62/732,151, filed Sep. 17, 2018, incorporated herein by reference in its entirety.

BACKGROUND OF THE INVENTION

Higher education in the United States faces increasing threats including increased competition from online programs that compete with regional monopolies, for-profit firms that offer low-cost certifications, and continued questions about relevance. In higher education, IT typically automates isolated processes or produces small, localized wins such as the use of Twitter inside a class. For example, learning-management systems (LMS) structure courses as independent entities so that learners outside an arbitrary boundary, i.e., those not enrolled in the course cannot access content. Administrative systems organize processes for recruiting, major field of study selection, and career placement as separate functions even though for example the recruiting process is intertwined with major selection and admissions. Overall, IT in higher education replicates existing structures (e.g., Blackboard, digitized administrative systems), force-fits new but incompatible technologies (e.g., Twitter, Facebook) onto those structures, or handicaps potentially transformative IT to fit existing structures (e.g., Edmodo, a social learning platform that conforms to traditional silos and hierarchies).

New technologies and concepts such as Massive Open Online Courses (MOOCs) and lecture video capture continue to focus on scale and access to the century old model of siloed knowledge transmission. A typical system will include a series of pre-recorded or live lectures broadcast online to students, along with a message board or other basic collaborative system for students to submit assignments and hold online discussions about course material.

The existing systems for online education and professional development face many challenges. Without in-person instruction, students need more focus, motivation, perseverance, and self-discipline to succeed. Online programs often face difficulty meeting standards for recruitment quality, retention, student success, and accreditation.

Thus, a new approach to education is needed, one that is centered on student development as the driver for success, rather than merely the automation of existing structures (e.g., recording a lecture) to increase scale and reach. Specifically, what is needed is an education program that quantifies professional development and applies high engagement to generate superior outcomes for both students and institutions. Disclosed herein is a Student Development System (SDS) which satisfies this need.

SUMMARY OF THE INVENTION

In one aspect, a method for quantifying the professional development of a subject includes storing, on a non-transitory computer-readable medium, a base professional development score for a subject, receiving a submission pertaining to at least one professional development activity of the subject, approving the submission based on at least one professional development criteria, assigning a value to the approved submission, adjusting the base professional development score according to the approved submission value, comparing the adjusted professional development score to a threshold value, and determining that the subject has achieved at least one professional development goal when the adjusted professional development score is greater than the threshold value. In one embodiment, the submission is received via a network interface. In one embodiment, the method further comprises the step of comparing the adjusted professional development score to a second professional development score associated with a second subject. In one embodiment, the method further comprises the step of awarding at least one badge to the subject after the subject achieves the professional development goal. In one embodiment, the method further comprises displaying the badge on an ePortfolio associated with the subject. In one embodiment, the method further comprises the step of assigning at least one peer analysis value to the subject based on the difference between the adjusted professional development score and an average of the professional development scores of other subjects. In one embodiment, the subject is assigned a peer analysis value of on track if the adjusted professional development score is within 1 standard deviation of the average professional development score.

In another aspect, a system for quantifying the professional development of a subject comprising a non-transitory computer-readable medium with instructions stored thereon, that when executed by a processor perform steps including storing, on the non-transitory computer-readable medium, a base professional development score for a subject, receiving a submission pertaining to a professional development activity of the subject, approving the submission based on at least one professional development criteria, assigning a value to the approved submission, adjusting the base professional development score according to the approved submission value, comparing the adjusted professional development score to a threshold value, and determining that the subject has achieved a professional development goal when the adjusted professional development score is greater than the threshold value. In one embodiment, the submission is received via a network interface. In one embodiment, the instructions further comprise the step of comparing the adjusted professional development score to a second professional development score associated with a second subject.

In another aspect, a system for network-assisted recruitment includes a prospect engagement module operatively connected to the network, configured to determine a student's interest level in a degree program, store the level of interest and associated information, encourage the student by offering various benefits to increase the level of interest and provide additional information, guide the student toward the degree program based at least in part on the determined interest level in the degree program, and assess and recommend admission based on the stored information. In one embodiment, the prospect engagement module is further configured to assign a benefit to the student when the determined interest level crosses a threshold. In one embodiment, the prospect engagement module is further configured to reduce communication with the student when the student indicates a decrease in interest. In one embodiment, the prospect engagement module is further configured to facilitate communication between students and alumni.

In another aspect, and designed specifically for 100% online degree programs, a system for network-assisted learning comprises at least one synchronous learnathon session wherein the student interacts in real time with at least one other student, at least one synchronous meetup session wherein the student interacts in real time with at least one other student, the meetup comprising a review session, and informal group discussions, at least one student-generated course element accessible to other students, a professional development module for quantifying the professional development of at least one student, and an ePortfolio module configured to register and share student achievements with corresponding point values. In one embodiment, the student achievements comprise a plurality of badges. In one embodiment, the ePortfolio module includes an element selected from the group consisting of a picture, a name, a hometown, contact information, a place of work, and a list of interests. In one embodiment, the at least one synchronous meetup session further includes interaction with a guest expert. In one embodiment, the learnathon comprises a structured session, group discussions, and a report.

In one embodiment, the system further comprises at least one course element generated by a member of the public not affiliated with the course. In one embodiment, the system further comprises a posting module configured to accept posts from students and share the posts with other students. In one embodiment, the system further comprises a rating system wherein students rate the posts of other students.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which.

DETAILED DESCRIPTION

It is to be understood that the figures and descriptions of the present invention have been simplified to illustrate elements that are relevant for a clear understanding of the present invention, while eliminating, for the purpose of clarity, many other elements found in related systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

In some aspects of the present invention, software executing the instructions provided herein may be stored on a non-transitory computer-readable medium, wherein the software performs some or all of the steps of the present invention when executed on a processor.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled or interpreted, including but not limited to C, C++, C#, Objective-C, Java, JavaScript, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G, 4G/LTE, or 5G networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

Throughout the disclosure, exemplary embodiments of professional development and/or assessment systems may be discussed through the use of illustrative examples, for example assessing the professional development of a student in their academic career. It is understood that these illustrative examples are not meant to limit the invention. The systems and methods disclosed herein may be used in a variety of other contexts, including but not limited to the professional development of employees, periodic assessments, training programs, or any other qualitative development program. For example, a system or method disclosed herein may be used by an employer to track and quantify the professional development of one or more employees during the course of their employment. A high calculated professional development score may then be used, for example, to determine or recommend certain employees for title changes, raises, or other benefits. Similarly, a lower calculated professional development score may be used to target employees who need extra help or intervention from management.

Student Development System

In one aspect, a system of the present invention is a Student Development System (SDS) platform that applies social and open concepts to change learning and student development. The platform may in some aspects be cloud hosted, or may alternatively be hosted on one or more individual servers connected to a computer network, for example the Internet or a local network. Examples of various elements offered by a SDS platform of the present invention include, but are not limited to, individual member sites, member profiles, avatars, friending, groups, and private messaging. Certain embodiments of the platform offer three distinct capabilities as described below. Each capability consists of a process innovation tied to specific software based on a set of core design principles.

In some embodiments, an SDS of the present invention has capabilities including, but not limited to: a customized look and feel relevant to higher education, one or more course sites, one or more member sites, one or more gradebooks, a system of leaderboards, and community activity news. Disclosed SDS platforms of the present invention differ advantageously from the current state of the art, which is normally termed a Learning Management System (LMS), because they apply the concepts of co-creation and openness to courses so that each member is an equal content generator and can access all content. A 'democratization' aspect ensures that in an SDS of the present invention, the instructors and students become mutually invested co-learners, which in turn increases engagement and accountability leading to better learning outcomes.

Some embodiments of an SDS of the present invention include some or all of the following design principles. First, all activity is open (e.g., a new post in a course is automatically published on the Internet or to all users, a widget displays 'who is online', ePortfolios are available on the Internet or to all users. Second, systems of the present invention are designed to enable connections and flow. All members can connect, communicate and share with one another (e.g., view profiles, message, share links). Third, all members have individual control to independently generate and control their content and manage their identity (e.g., create a site, choose how to earn professional development points, view and use dashboard analytics designed to help students compare their development and progress to others). Fourth, SDSes of the present invention include tools implemented to encourage discovery of new members, new activity, and content (e.g., a community activity list, a leaderboard, search, tagging, permanent URLs, PRO point calendar). Fifth, all activity and content is aggregated and collated, (e.g., sites are automatically published through RSS, badges, graduation analysis and peer comparison analysis on the PRO dashboard). Overall, because all activity is visible to all stakeholders, systems of the present invention are designed to build a community of students, faculty, staff, and external partners, which form a virtuous cycle to promote learning and professional development.

Structured Professional Development Program

In some embodiments, an SDS of the present invention comprises a structured and quantified professional development program. Such structured professional development programs of the present invention are unique because they include various incentives and penalties, (sometimes interchangeably referred to herein as 'carrots and sticks'), including but not limited to professional achievement points (PRO points), graduation requirements based on PRO points, course checkpoints that require a minimum level of PRO points, reward points, a store consisting of branded merchandise which can be purchased using the reward points, and a leaderboard showcasing the top PRO point achievers. Students may earn a number of PRO points for an approved professional development activity (e.g., internships, leadership in student organizations, participating in a development workshop, participating in or winning a contest, participating in a career fair, participating in a project, being an active member of a student organization, creating an advanced ePortfolio, conducting a research project, meeting with industry executives, attending a professional conference, and others). Overall, the 'continuous professional development model' (CPDM) is the new process innovation that replaces isolated and ad hoc activities such as visiting a career center once with no follow-up into a regular structured process that is quantified through PRO points.

Figure 1A:
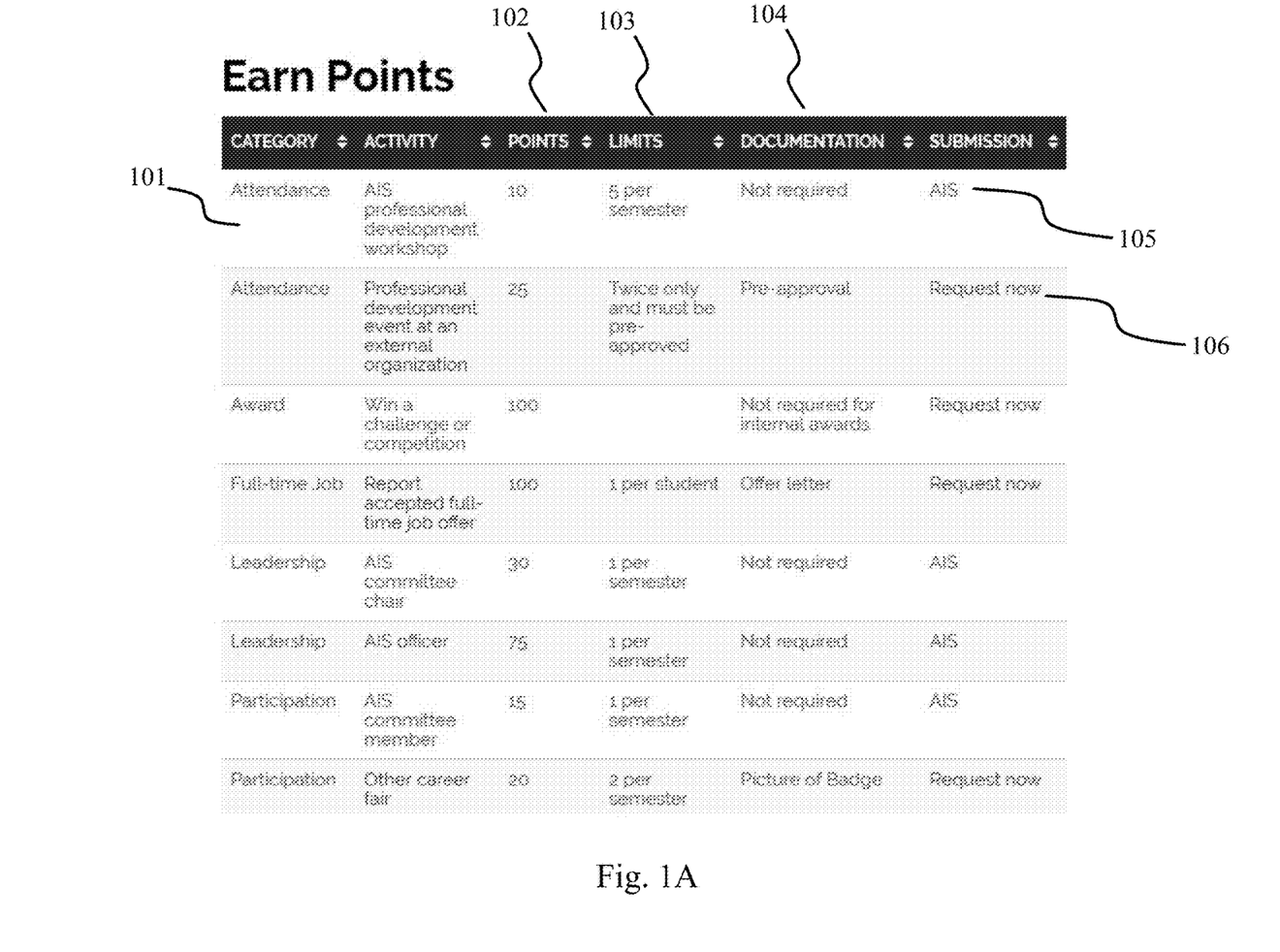
FIG. 1A is an exemplary interface screen of the present invention.

One example of a point interface is shown in FIG. 1A. A listing of professional development activities 101 is shown, each having a name and a quantity of available point 102 assigned. In some embodiments, one or more of the professional development activities has a limit 103 for a number of times it may be performed, either total, per student, per semester, per month, or any other suitable limit. Some professional development activities may require documentation 104 in order to validate them, although other professional development activities may not require documentation. In the listing shown in FIG. 1A, for example, documentation is not required for attendance at a professional development workshop, but an accepted full time job offer requires an offer letter as supporting documentation. Finally, one or more of the professional development activities may require pre-approval. In some embodiments, some professional development activities may be requested by clicking a link 106 for example in an online portal. In some embodiments, some professional development activities may be requested or submitted by a third party, for example a student organization in the example shown in FIG. 1A. In the depicted example, the student organization is the Association for Information Systems (AIS).

In some embodiments, an SDS of the present invention includes a system of rewards points which can be redeemed for tangible or intangible rewards, for example in a PRO store. Such a rewards system serves to encourage students to participate in activities. Each earned PRO point may also earn a Reward point. Reward points may be used for purchases in the PRO store. In one embodiment, Reward points are deducted each time a purchase is made in the PRO store. PRO points are not deducted for purchases in the PRO store, only Reward points. The PRO store includes branded swag such as mascots, pins, hats, polos, padfolios, t-shirts and many more exciting items designed to motivate. The PRO Store uses Reward points as currency.

Systems and methods of the present invention leverage certain concepts from social media or social IT implementations, consistent with the theory of Complex Adaptive Systems (CAS). More information about CAS may be found in Mandviwalla, M., & Schuff, D. (2014), "Reimagining the Higher Education Experience as a Socially-Enabled Complex Adaptive System." System Sciences (HICSS), 2014 47th Hawaii International Conference on, 4546-4555; and Mandviwalla, M., Schuff, D., Chacko, M., & Miller, L. (2013). "Is That All There Is? Taking Education to New Levels in the Social-Media Era." Change: The Magazine of Higher Learning, 45(5), 51-58; both of which are incorporated herein by reference in their entirety. The CAS model provides the conceptual and architectural backdrop for some embodiments of social IT platforms of the present invention. Such social IT platforms are designed to replace traditional institutional websites as well fulfill many of the functions typically performed by an SDS. The social aspects of the platform are important in higher education because first, social media is easy to use, familiar, and can naturally fit the lifeworld of the major agent (students). Second, unlike other technologies, the focus of social media is people, the most important resource and product of higher education. Third, the salient characteristic of social media—interactivity—increases and changes the connections and resource flows among agents. This can lead to new, transformative structures and outcomes that enhance and leverage the peer-to-peer structure of higher education.

Figure 1B:
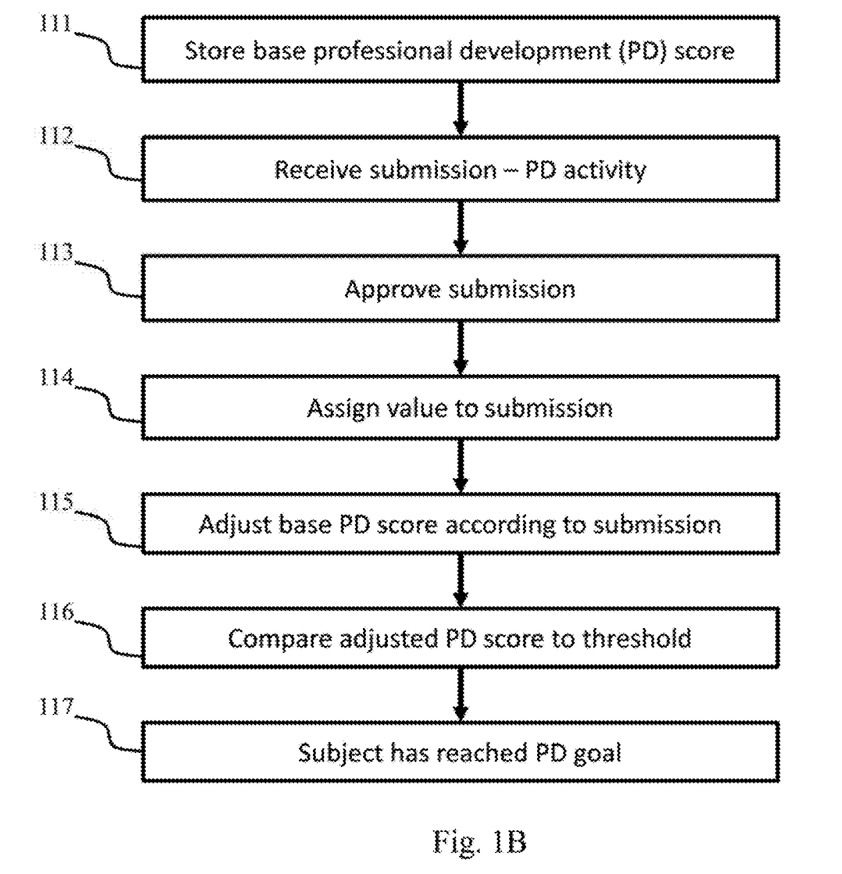
FIG. 1B is a method of the present invention.

Referring now to FIG. 1B, a method of the present invention is shown. An exemplary method for quantifying the professional development of a subject comprises step 111, storing, on a non-transitory computer-readable medium, a base professional development score for a subject; step 112, receiving a submission pertaining to a professional development activity of the subject; step 113, approving the submission based on at least one professional development criteria; step 114, assigning a value to the approved submission; step 115, adjusting the base professional development score according to the approved submission value; step 116, comparing the adjusted professional development score to a threshold value; and step 117, determining that the subject has achieved a professional development goal when the adjusted professional development score is greater than the threshold value.

Figure 1C:
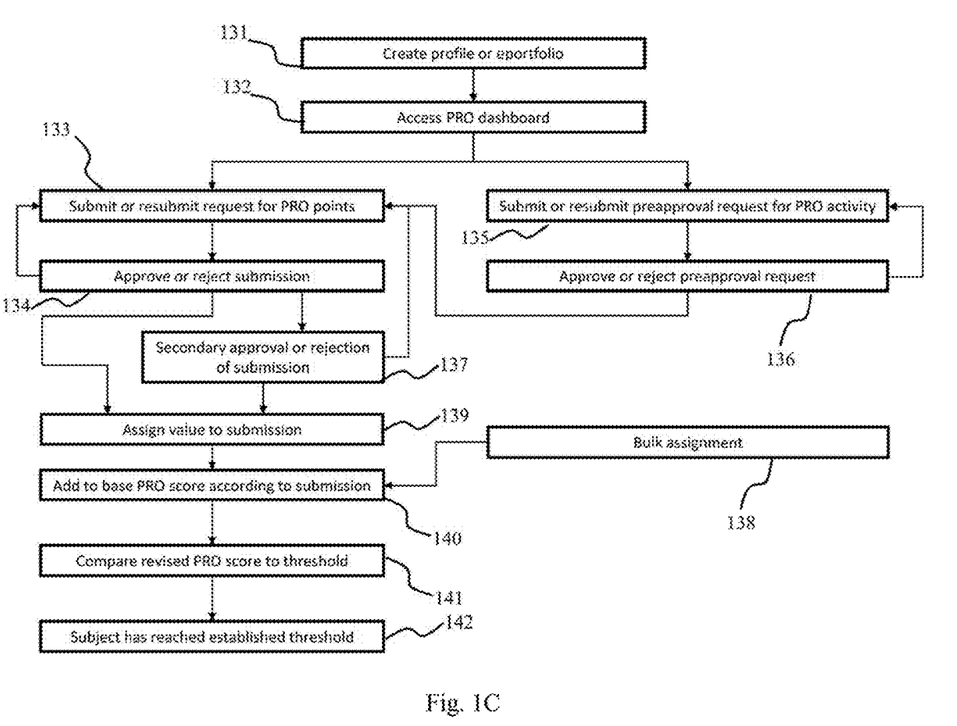
FIG. 1C is an exemplary workflow of the present invention.

Referring now to FIG. 1C, an exemplary workflow of the present invention is shown. A user of the system creates a profile or ePortfolio in step 131, and then gets access to the PRO dashboard in step 132. The user may then request PRO points, either by submitting a request for PRO points, for example from a known activity, in step 133 or submitting a preapproval request for a PRO activity in step 135. The submissions may then be approved or rejected, in steps 134 and 136, respectively. When a request is rejected, the user may proceed to resubmit the request in step 133 or 135, as applicable. In some embodiments, a secondary approval or rejection of a submission may be required in step 137, for example relevant faculty may be required to approve a faculty project. In some embodiments where a preapproval has been approved in step 136, a user may then perform the approved activity and request the PRO points from that activity in step 133.

After an activity has been approved, the system may assign a point value to the submission in step 139. The point value may be either pre-assigned or assigned based on the discretion of another user, for example an instructor or administrator. The value of points is then added to the base PRO score of the user in step 140. In some embodiments, for example when a large group of users complete an activity substantially simultaneously, a list of users may have a PRO score applied in a bulk assignment in step 138. For example, all attendees of a career fair may be granted a predetermined number of points in a single transaction. The updated PRO score or scores may then be compared to one or more thresholds in step 141, and once the user has reached the established threshold, the system determines that the user has achieved a professional development goal associated with that threshold. Examples of thresholds for use in the depicted workflow include, but are not limited to, graduation thresholds, class thresholds, or badge thresholds.

In one exemplary embodiment, a social IT platform of the present invention is implemented as a Web 2.0 cloud-hosted platform based on WordPress, an open source content management system, and BuddyPress, a social media plug-in that adds member profiles, avatars, friending, groups, and private messaging. Embodiments of the present invention may further include other plugins or modules, including but not limited to JetPack, StudioPress, and Akismet. Although WordPress is used as a content management system (CMS) in the depicted example, it is understood that systems and method of the present invention may be implemented using different tools or CMSes, or may alternatively be deployed as custom solutions that do not use a CMS. The platform includes a customized look and feel relevant to higher education, custom developed plugins (e.g., gradebooks, leaderboards, ePortfolio wire, ePortfolio search, ePortfolio badges), templates (for course and ePortfolio creation), and tutorials. All content including courses, members, and the individual sites of each member including their profiles, ePortfolios, and activities are open and accessible over the Internet. All members are content generators and aggregators while white pages (profiles), internal messaging, site wide activity "wires", chat, and commenting support interaction and discovery.

The institutional goals of the exemplary platform include recruitment, high quality education, placement, and building a reputation. Faculty, students, courses, and administrative units are internal agents that instantiate institutional goals such as teaching, taking courses, studying, advising, and grading. Every student, faculty, and staff member create and maintain their online brand through an "ePortfolio" site. Each course is a separately managed site, and members can create additional sites (e.g., projects). Instructors may post lectures, announcements, as well as interactive questions on the platform. The open content promotes conversations and sharing. For example, students may compare and use content across sections of the same course even when the instructors are different. The site-wide activity feed on the front page (similar to existing social media feeds, for example the Facebook news feed) fuels additional interaction. In the feed, all sites get equal display priority including student managed sites. Members update their profiles to indicate their interests as well as job status, and the changes are pushed to the community, while instructors use commenting, rating, and voting to sustain interaction.

Figure 2A:
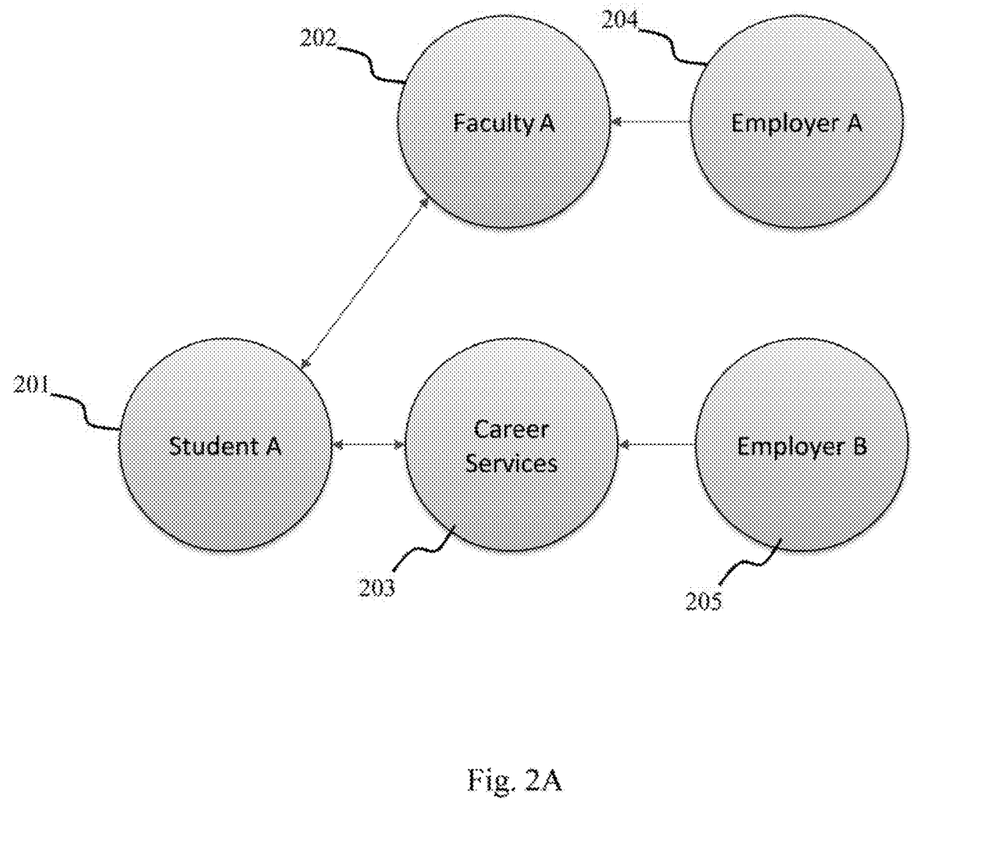
FIG. 2A is a flow diagram of a traditional student development model.
Figure 2B:
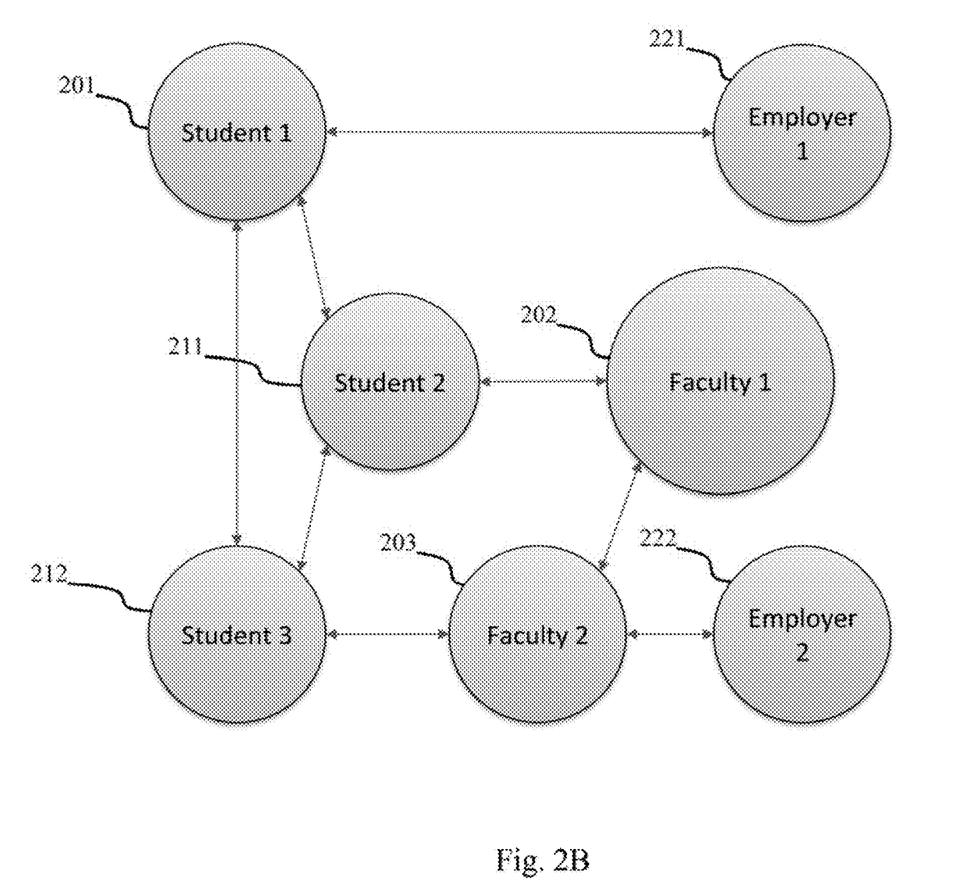
FIG. 2B is a flow diagram of a student development model of the present invention.

Traditionally, student professional development and placement is characterized by a series of isolated and sequential interactions. In one example, a student submits their resume to employers, the career services office distributes job postings, and a faculty member provides mentoring about careers. Student development in a Continuous Development Model changes how students develop, network, and seek jobs into a continuous process. With reference now to FIG. 2A and FIG. 2B, the effect of applying a CDM to student development is shown. FIG. 2A is a typical workflow for employer-student contact whereby students 201 principally interact with prospective employers 204 and 205 via faculty 202 and/or career services 203. FIG. 2B shows a CDM workflow, whereby students 201, 211, 212 interact with one another, and also directly with employers 221, while also communicating with faculty 202 and 203 to reach other employers 222.

In one illustrative example, student 212 looks at student 201 and realizes student 201 has very little content, for example internships and projects. Student 211 knows student 212, sees student 212's updates and congratulates student 212 in the hallway on a project. Student 212 takes a look at student 211's profile and appropriates student 211's explanation of an internship into student 212's site. Employer 221 uses the system to search for a candidate and identifies student 201. Employer 221 is so impressed with student 201 that employer 221 asks student 201 to identify additional recruits. Student 201 identifies student 211. Student 211 has in the meantime formed a relationship with faculty 202 who has given student 211 extensive feedback on student 211's development. Employer 222 contacts faculty 203 because employer 222 is looking for an intern with some special skills. Faculty 203 then identifies student 212. Students realize early that their ePortfolio is their "always on" professional identity, and therefore that career planning starts much earlier. For example, students may be required to identify job interests to be listed in the search engine. For many students, this is the first time that they have had to formally list their professional interests. Similarly, when students start their ePortfolio, they realize that they have very little content. The best students immediately start seeking professional and intellectual development activities, especially, when they see other students with "better" content. Finally, since all changes show up on the site-wide activity feed, students start building their network early by checking on each other. Exemplary ePortfolios may be appropriated into many other activities, and the open, individual control, and discoverable and aggregation design principles of the platform further fuels this appropriation, leading to a virtuous self-reinforcing cycle—a continuous development model that energizes the community at different parts of the value chain. The model plays a major role in achieving the institutional goal of placement.

Figure 3A:
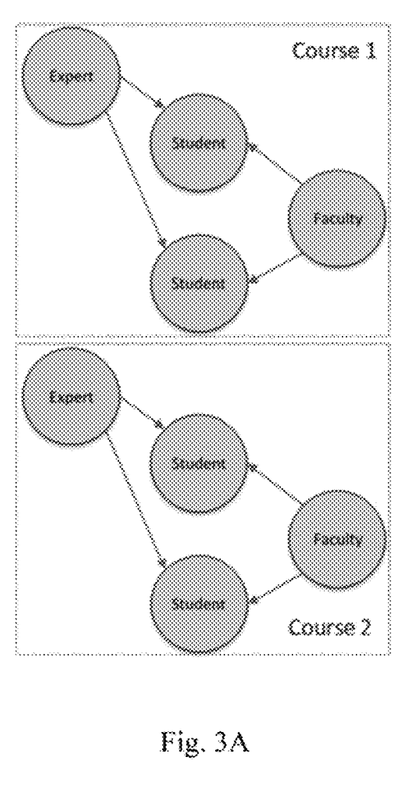
FIG. 3A is a flow diagram of a traditional course structure.
Figure 3B:
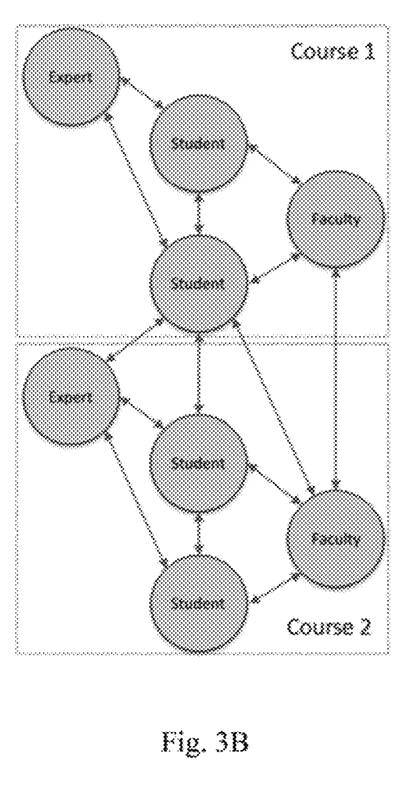
FIG. 3B is a flow diagram of a co-creation course structure of the present invention.

Traditional courses are usually closed systems in which instructors disseminate pre-packaged knowledge, students receive that knowledge, and then demonstrate mastery. In the co-creation model students and faculty co-create the course content, and bring in new and different sources of knowledge. FIG. 3A and FIG. 3B contrast the two approaches. In FIG. 3A, the interactions are limited to Faculty-Student and Expert-Student, and the two courses remain essentially siloed off from one another. In FIG. 3B, the addition of Student-Student interactions means that course material from course 1 that might be beneficial to students in course 2 may be shared, thus strengthening the curriculum of all courses whose material is made accessible in this way. Co-creation of content with students involves two forms of content: (a) ideas, concepts, and facts that are newly developed or sourced from outside, and (b) discussion threads that reveal new insights about the pre-packaged content. Co-creation can be instantiated within, outside, and across courses. Within courses students are co-authors that are expected to actively bring in and post new content (e.g., relevant news). Outside the course the model is a magnet for relevant knowledge from experts. For example, a student news story about a critic of electronic medical records may result in the critic finding the post and providing additional resources on the course site. Similarly, a data.gov member found course discussion on the U.S. Government's Open Data Initiative, and provided commentary and encouragement. Students formally engage with one another across courses to bring new energy into the original section. For example, students in one section receive credit for contributing content to another section, or are formally dependent in which one course produces content and the other consumes. The co-creation model is a digital makeover of the traditional seminar; it enables, increases, and sustains interaction at a level and scope far beyond what has been achieved ePortfolio Some embodiments of the present invention include an ePortfolio, an Internet-accessible profile that in some embodiments displays PRO point activity—creating a digital brand that serves as a role model for others. Various embodiments may include a system of Badges, configured to show various levels of achievement. ePortfolios may further include posts by one or more users of the system which may for example demonstrate critical thinking and reflection about an activity such as career interests and aspirations, personal interests and volunteer work, descriptions of current and past work experience, downloadable samples of work (e.g., a project or presentation), classes taken and results that describe what was learned, and pictures that highlight any of the above items.

In some embodiments, the ePortfolio may be seen as a living collection of documents that showcase a student's achievements and establishes a digital identity. Beyond a basic template for formatting and some guidelines, students maintain high individual control. Students have complete and sole control over their ePortfolio content. A typical ePortfolio may include elements including but not limited to sample projects, internship descriptions, posts about current events, and media such as pictures and video. The fundamental change brought on by ePortfolios is that they provide a richer way to communicate identity than paper resumes and can be updated regularly and in near real-time, residing on a server that is accessible anytime and anyplace.

In some embodiments, regular check points are used to ensure that students continuously develop their ePortfolio. In one example, students are required to create an ePortfolio in the first course of their major. Subsequent courses may then generate new relevant content (e.g., projects). Aggregation ensures that activities such as starting an ePortfolio, submission to the official ePortfolio search engine, and changes to profile fields show as notifications on the site's main page. The entire community is thereby energized by each new ePortfolio or update notification. Further, discovery mechanisms ensure community members can read, reference, and comment on each ePortfolio. For example, students may post positive comments on a particularly informative ePortfolio site or link directly to that content. That site will quickly gain visibility and become a model for others when comments show up on the site-wide activity feed or appear as embedded URLs elsewhere on the site.

In some embodiments, access to ePortfolio content is not password protected nor controlled by the department, and is automatically posted on the Internet and search engine optimized (SEO). Each ePortfolio may in some embodiments be identified with a simple permanent URL for sharing on email, traditional resumes, and other social networks, for example but not limited to LinkedIn. Potential employers thereby are able to get on-demand access to rich information at a low time cost. Some managers may for example use ePortfolios as a substitute for initial screening to identify a smaller set of candidates for second-round interviews.

The model applies local and external visibility to motivate, legitimize, and empower. In some embodiments, an authorization/approval level is added, and students must have their site formally approved to be listed in the official ePortfolio search engine, providing employers with the filter of institutional legitimization.

In one illustrative example, an employer may send the following request: I am looking for an intern who can present well, with good analytical skills, and interest in healthcare. When using a system of the present invention including ePortfolios, the employer, a representative of the employer, or the career services office may then use the search function to identify a short list, forms a recommendation, and then respond with links. The process transforms the time consuming task of asking for recommendations, verifying interest, and collecting resumes. The platform also empowers by pushing simple site analytics to each member. For example, a student who had a job interview the following morning might notice that there was traffic from the employer's network on a post about his internship. The student could then collect extra material and focus the interview on the internship, making her a more appealing candidate.

The check points, interactivity, internal and external visibility, and the flat and open structure transforms professional development into a continuous process instead of discrete and disconnected events. In the continuous development model, students realize early that their ePortfolio is their "always on" professional identity. As a result, career planning starts much earlier. For example, in some embodiments, students are required to identify job interests to be listed in the search engine. For many, this is the first time that they have had to formally answer that question. Similarly, when students start their ePortfolio, they realize that they have very little content. The best students immediately start seeking professional and intellectual development activities, especially, when they see other students with "better" content. Finally, since all changes show up on the site wide activity feed, students start building their network early by checking on each other.

An interface of the present invention may further include a dashboard which provides analytics on graduation status, comparison with peers, a points calendar, and a calculation and display of available Reward points. All of these capabilities guided by the CPDM prepares students for the workplace so that they are more marketable, leading to increased and better placement.

Figure 4:
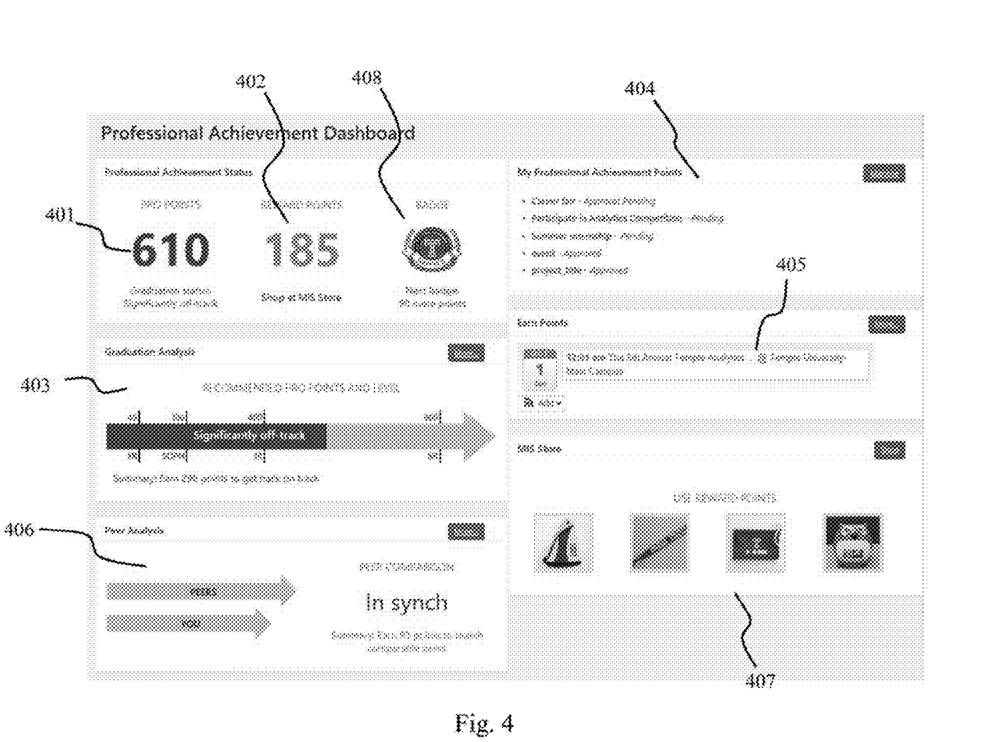
FIG. 4 is an exemplary interface screen of the present invention.

An exemplary dashboard of the present invention is shown in FIG. 4. A professional achievement dashboard may include a display of a user's accumulated PRO points 401, as well as a separate listing of the user's accumulated rewards points 402. Dashboards of the present invention may also include a section displaying one or more badges 408 earned by the user. Where badges follow a progression, the dashboard may also display the number of points needed to reach the next badge in the progression. For example, in FIG. 4, the user has earned the novice badge, but will reach the next badge in the progression after earning 90 more points.

Dashboards of the present invention may also include a tracker for the number of points needed to reach a specific goal, for example the graduation tracker 403 shown in FIG. 4. The tracker may include an indication as to whether the student is on track, off track, or ahead of track, either compared to their peers or calculated by one or more algorithms. Similarly, a peer analysis 406 may include a graphical and/or numerical comparison of where a student stands with respect to one or more peers. In some embodiments, a peer analysis 406 may compare a student to a specific peer or group of peers. In other embodiments, a peer analysis 406 may compare a student to an average or weighted average of a group of peers or all peers within a program. A professional achievement point listing 404 may include a list of professional development or professional achievement activities for which the user has requested points, as well as the status of those requests. A calendar 405 may include a listing of past, current, or upcoming opportunities to earn more professional development points. A point store section 407 of an exemplary dashboard may provide functionality for exchanging points, for example reward points, for tangible or intangible items, including but not limited to branded swag such as mascots, pins, hats, polos, padfolios, or t-shirts.

The PRO analysis table enables administrators to intervene and assist struggling students by summarizing student progress, including listing the analytics such as the graduation analysis. A combined academic achievement (GPA) and professional achievement (points) score, provides a quick yet comprehensive snapshot of each student as well as the basis to recognize top performers. In some embodiments, individual courses may include as a requirement that a certain number of points be earned by all students. In some embodiments, the requirement may be a pre-requisite (i.e. a student must have earned a certain number of points in order to register for a course). In other embodiments, the requirement may be a requisite for completion of the course (i.e. the student must earn a certain number of points in order to receive a grade in a course). In some embodiments, if a student fails to earn a required number of points during a course, she will receive a grade of incomplete or a failing grade in the course. In some embodiments, if a student fails to earn a required number of points during a course, she will receive a lower letter grade than if she had completed the required number of points in the course.

Some embodiments of systems of the present invention comprise one or more algorithms for peer comparison and analysis. For example, a system of the present invention may calculate or and display the average number of points by class level. In some embodiments, a system of the present invention may calculate the deviation of a given student's points from an average number of points, either by class level or across some other selection of students. In another example, a student progress rating may be calculated based on the difference between the given student's points and the average point by class level. In one embodiment, a student whose points total is less than two standard deviations below the average points by class level will be considered "significantly behind." In one embodiment, a student whose points total is less than one standard deviation below the average points by class level will be considered "behind." In one embodiment, a student whose points total is within 0.1 standard deviations of the average points by class level will be considered "in synch." In one embodiment, a student whose points total is greater than one standard deviation above the average points by class level will be considered "ahead." In one embodiment, a student whose points total is greater than two standard deviations above the average points by class level will be considered "significantly ahead."

Online Community Model

Certain aspects of the invention may be collectively or individually referred to as an Online Community Model (OCM). OCM is a collection of systems and platforms based around the idea that engagement is a key concept to address the challenges of online learning. The existing systems for online education and professional development face many challenges. Without in-person instruction, students need more focus, motivation, perseverance, and self-discipline to succeed. Online programs often face difficulty meeting standards for recruitment quality, retention, student success, and accreditation. OCM serves as an enabler for online courses, program related news, student groups, professional development, and interaction among relevant stakeholders.

In various implementations, an OCM may include some or all of: a system for prospect engagement, wherein each prospect takes a tailored journey through a recruitment funnel based on increasing (or decreasing) interest level in one or more degrees; one or more learnathons, synchronous sessions analogous to the "hackathon" concept that may include a short review of content, breakout group discussions, and report outs; meetups, which are short informal synchronous sessions; one or more co-creation elements, defined as course material created and shared by one or more students in a class; and ePortfolios (as described above). When deployed and used in concert, these elements combine to generate a continuously updated student digital brand.

In some embodiments, prospect engagement starts with a face-to-face or digital encounter. Each prospect takes a tailored journey through the recruitment funnel. After the initial inquiry, all prospects create a profile on a platform. One cornerstone of the approach is that once a person becomes a member of the community, they can learn more about, and engage with any other member. The key of course, is to become a member. This profile is comprehensive including items that are normally part of an application. However, the approach mimics social media in which users are slowly encouraged to add items to build their profile to increase their engagement. At the onset, only minimal information may be requested (name, email, and interest level). Further, all activity may be made public in some embodiments so that prospects can see non-confidential aspects of each person. Next, prospects may receive personalized communication which includes incentivizes to enhance their profile (such as a picture, unofficial grades, test scores, links to outside social media accounts including for example LinkedIn). The incentives, which are engagement centric, may vary based on the completeness of the profile and qualifications of the prospect. Examples of incentives include, but are not limited to invitations to information sessions, opportunity to post in a forum, receive news about the program, attendance at events, access to chat with a faculty member, access to join a class, chat with a current student, access to advisory council conversations, review of credentials, one on one call with advisor, GMAT/GRE waiver option or pre-acceptance.

In some embodiments, the prospect can indicate an increasing (or decreasing) interest level in joining a program. For example, if a prospect indicates a decrease in interest, a system of the present invention may reduce communication and move the prospect further down the list. This allows the program coordinators to focus on a continuously prioritized list of genuinely interested prospects. The cycle may in some embodiments include engagement with alumni who make themselves available for Q&A. The non-confidential aspects of their profile becomes their public student profile (e.g., picture, name, hometown, contact information, place of work, interests), which allows the full community to easily learn more about each new person. Prospect-alumni engagement adds another facet to the community driven nature of the program, in that now, a prospect can engage with a real live member of the community that they are interested in joining.

The meetup concept borrows from the notion of a tech meetup, where likeminded people come together to discuss topics of interest. An exemplary meetup might be a short informal 1-hour online synchronous session on a weekend. The instructor leading that week's learnathon may also in some embodiments organize the corresponding meetup. The focus is less on the instructor and more on the student. Each meetup may involve for example Q&A with guest experts, clarification on content or assignments, and discussion of current topics. In that sense, meetups of the present invention are similar to 'recitation' sections in traditional courses. However, unlike formal recitation sections, the meetup ends when the student interest in engagement ends.

Co-creation involves two forms of content. The first is ideas, concepts, and facts that are newly developed or sourced from outside, and the second is discussion threads that reveal new insights about the pre-packaged content. Co-creation can be instantiated within, outside, and across courses. Within courses, students are coauthors that are expected to actively bring in and post new content (e.g., relevant news). Outside the course the model is a magnet for relevant knowledge from experts. In one example, a student news story about a critic of electronic medical records might result in the critic finding the post and providing additional resources on the course site. Similarly, a data.gov member might find a course discussion on the U.S. Government's Open Data Initiative, and provide commentary and encouragement. Students formally engage with one another across courses to bring new energy into the original section. For example, students in one section receive credit for contributing content to another section, or are formally dependent in which one course produces content and the other consumes.

In some embodiments, students may be required to "post" content in a course. Posts may be expected to integrate the course material to explain, expand, or critique a selected topic. Further, students may also be required to "comment" on each other's posts, and may be encouraged to write subsequent posts that follow from their comments. This increases engagement, in that the person commenting on a post now has the basis to start a conversation with the author. Moreover, they now have a richer understanding of the interests and values of the author. Near the end of the first term for example, students may be required to post their content on a public, personalized online ePortfolio. The ePortfolio creates a digital identity or "brand" for the student. It also provides the basis for more internal and importantly external engagement with others including industry guests. Lastly, in some embodiments, students may rate each other's posts once they have read them. Students may be required to rate a fixed number of posts or all posts—generating an intrinsic desire to obtain high ratings amongst their peers—as well as friendly lobbying attempts. Lobbying is healthy and encouraged since it further promotes engagement.

The openness fuels a "tipping point" to increase and sustain fluid interaction that is different from a traditional bulletin board. The accessibility and ease of use brings in new content rather than the typical discussion of existing content. Second, students have a high degree of individual control over the course site. In some embodiments, students have full authorship and responsibility over their posted content; the flat structure gives students' posts the same status and display attributes as the instructor's content—it is not in a different "area." Therefore, interaction can originate from and be led by students. They are motivated to engage others because when they respond, it publicly validates their contribution within the course, across the community, and on the Internet.

One important aspect of a system of the present invention is the cohorted nature of the program. Cohorts allow for engagement among students who develop deeper relationships with each other throughout the courses and group work. Students may build relationships with each other both inside and outside of the virtual space, often meeting up in their shared locations in person, using collaboration tools including but not limited to group texts, Slack and Google Hangouts to keep their conversations going. Keeping students engaged with each other is very important to systems of the present invention—students, when engaged with each other and the faculty, will stay in the program. Obviously, the goal is to graduate 100% of each incoming cohort, with all students in a cohort traveling through the program at the same pace. As with any social grouping, when a cohort of students feel connected to each other, they will work to maintain those connections accordingly, completing their coursework together and graduating with their classmates, driving one another to succeed.

Another outcome is that students leverage discovery mechanisms—in one example, a student links posts to their ePortfolio, highlighting them for internal and external agents such as students and potential employers. Every post and comment to a course may be aggregated on the site-wide activity feed, and can be also displayed in an area on the course's front page. Together, this can spark interest from and bring in new knowledge from external agents (e.g., students in different classes, faculty, and outside experts).

A "learnathon" as described herein adopts "sprint" terminology from agile programming paradigms to collaborative education. It is similar in many respects to the "hackathon" concept, which connotes focused problem solving. In one embodiment, a learnathon of the present invention comprises a three-hour "sprint" of in-person or real-time Internet-enabled collaboration among a set of students and faculty on a topic. In one example, students hear from professors on one or more key concepts associated with the material of a course. In some embodiments, students work together in one or more virtual "breakout rooms" to discuss relevant topics and perform activities. In some embodiments, learnathons further include one or more industry experts.

Some additional aspects of learnathons of the present invention may include for example one or more short 20-30 minute reviews of course content (similar to a traditional lecture); breakout group discussion and/or activities that leverage the online space so that each group has its own "room;" random pairings of students divided into rooms to dive deep into a topic and then present back to the larger group; report outs and discussion in which faculty call out specific students to participate; and case study discussions in which students provide insight on an industry specific case related to the course topic—comparing the current environment at the organization to the challenges of developing solutions for the future.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A method for managing an e-Portfolio associated with an interface screen, wherein the e-Portfolio is associated with a site with a link on a content management server (CMS) for a subject, the method comprising:
   storing a base professional development score on the e-Portfolio for the subject;
   storing the site comprising content to be listed in a search engine for the e-Portfolio;
   displaying, on the interface screen, a dashboard, wherein the e-Portfolio is associated with the dashboard;
   displaying, on the interface screen, a listing comprising a submission link among a plurality of submission links;
   receiving a submission, using the submission link, pertaining to at least one professional development activity of the subject;
   approving the submission based on at least one professional development criterion;
   assigning a value to the approved submission;
   adjusting the base professional development score according to the approved submission value;
   comparing the adjusted professional development score to a threshold value;
   determining that the subject has achieved at least one professional development goal when the adjusted professional development score is greater than the threshold value;
   receiving a request to search the content for subjects matching a set of criteria, the criteria comprising achievement of the at least one professional development goal;
   searching with the search engine for a match on the content; and
   returning a plurality of links, provided by the search engine, comprising the link to the site for the e-Portfolio of the subject.

2. The method of claim 1, further comprising the step of comparing the adjusted professional development score to a second professional development score associated with a second subject.

3. The method of claim 1, further comprising the step of awarding at least one badge to the subject after the subject achieves the professional development goal.

4. The method of claim 3, further comprising displaying the badge on the e-Portfolio of the subject; and
   indicating a level of achievement of the subject on the interface screen.

5. The method of claim 1, further comprising the step of assigning at least one peer analysis value to the subject based on a calculated difference between the adjusted professional development score and an average of professional development scores of other subjects.

6. The method of claim 5, further comprising the step of indicating a position of the subject on a track on the interface screen;
wherein the subject is assigned a peer analysis value of "on track" if the adjusted professional development score is within 1 standard deviations of the average professional development score.

7. The method of claim 1, further comprising the steps of:
awarding reward points to the subject for completing the professional development activity; and
selling a tangible item to the subject in exchange for a quantity of the reward points.

8. The method of claim 7, wherein the tangible item is selected from a mascot, a pin, a hat, a polo, a padfolio, or a t-shirt based on points.

9. The method of claim 1, further comprising the step of performing, as the subject, a professional development activity selected from an internship, volunteer work, leadership in a student organization, participating in a development workshop, participating in or winning a contest, participating in a career fair, participating in a project, being an active member of a student organization, meeting with industry executives, or attending a conference.

10. The method of claim 1 further comprises granting a benefit to the subject selected from a raise, title change, admission to an institution, an adjustment to a grade, or graduation.

11. A system for managing an e-Portfolio associated with an interface screen, wherein the e-Portfolio is associated with a site with a link on a content management server (CMS) for a subject comprising a non-transitory computer-readable medium with instructions stored thereon, that when executed by a processor, causes the processor to perform steps comprising:
storing a base professional development score on the e-Portfolio for the subject;
storing the site comprising content to be listed in a search engine for the e-Portfolio;
displaying, on the interface screen, a dashboard, wherein the e-Portfolio is associated with the dashboard;
displaying, on the interface screen, a listing comprising a submission link among a plurality of submission links;
receiving a submission, using the submission link, pertaining to a professional development activity of the subject, the professional development activity selected from an internship, volunteer work, leadership in a student organization, participating in a development workshop, participating in or winning a contest, participating in a career fair, participating in a project, being an active member of a student organization, meeting with industry executives, or attending a conference;
displaying a list of prior submissions on;
approving the submission based on at least one professional development criterion;
assigning a value to the approved submission;
adjusting the base professional development score according to the approved submission value;
comparing the adjusted professional development score to a threshold value;
determining that the subject has achieved a professional development goal when the adjusted professional development score is greater than the threshold value;
receiving a request to search the content for subjects matching a set of criteria, the criteria comprising achievement of the at least one professional development goal;
searching with the search engine for a match on the content; and
returning a plurality of links, provided by the search engine, comprising the link to the site for the e-Portfolio of the subject.

12. The system of claim 11, wherein the instructions further comprise the step of comparing the adjusted professional development score to a second professional development score associated with a second subject.

13. The system of claim 11, wherein the subject is an employee and the system is configured to track the professional development of the employee in the course of employment.

14. The system of claim 13, wherein the instructions further comprise the step of recommending a title change or pay increase based on the adjusted professional development score.

15. The system of claim 11, wherein the instructions further comprise the steps of:
awarding reward points to the subject for completing the professional development activity; and
selling a tangible item to the subject in exchange for a quantity of the reward points.

16. The system of claim 15, wherein the tangible item is selected from a mascot, a pin, a hat, a polo, a padfolio, or a t-shirt.

17. The system of claim 11, wherein the steps further comprise granting a benefit to the subject selected from a raise, title change, admission to an institution, an adjustment to a grade, or graduation.

* * * * *